US012743050B2

(12) United States Patent
Ohwada et al.

(10) Patent No.: US 12,743,050 B2
(45) Date of Patent: Sep. 22, 2026

(54) COOLING DEVICE FOR FIXING DEVICE

(71) Applicant: HEWLETT-PACKARD DEVELOPMENT COMPANY, L.P., Spring, TX (US)

(72) Inventors: Satoshi Ohwada, Yokohama (JP); Hiroyuki Sato, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 40 days.

(21) Appl. No.: 18/866,067

(22) PCT Filed: Apr. 12, 2023

(86) PCT No.: PCT/US2023/018394

§ 371 (c)(1),
(2) Date: Nov. 14, 2024

(87) PCT Pub. No.: WO2023/244289

PCT Pub. Date: Dec. 21, 2023

(65) Prior Publication Data

US 2025/0315009 A1 Oct. 9, 2025

(30) Foreign Application Priority Data

Jun. 15, 2022 (JP) ................................ 2022-096228

(51) Int. Cl.
*G03G 21/20* (2006.01)
*G03G 15/20* (2006.01)

(52) U.S. Cl.
CPC ....... *G03G 21/206* (2013.01); *G03G 15/2017* (2013.01); *G03G 15/2064* (2013.01); *G03G 2215/2025* (2013.01)

(58) Field of Classification Search
CPC ............. G03G 21/206; G03G 15/2017; G03G 15/2021; G03G 15/2039; G03G 15/2042; G03G 15/2053
See application file for complete search history.

(56) References Cited

U.S. PATENT DOCUMENTS

2006/0140662 A1 6/2006 Nagase
2016/0349701 A1 12/2016 Masuta et al.

FOREIGN PATENT DOCUMENTS

JP 2005-202247 A 7/2005
JP 2010-282582 A 12/2010
JP 2013-054283 A 3/2013
JP 2014-060012 A 4/2014

*Primary Examiner* — Thomas S Giampaolo, II
(74) *Attorney, Agent, or Firm* — Foley & Lardner LLP

(57) ABSTRACT

A cooling device includes a shaft that rotatably extends adjacent to a fixing device, a blade device including a blade coupled to the shaft, and a housing to accommodate the blade device, the housing including an inlet to draw in air and an outlet disposed to direct the air toward a heating body of the fixing device.

12 Claims, 11 Drawing Sheets

COOLING DEVICE FOR FIXING DEVICE

CROSS-REFERENCE TO RELATED APPLICATIONS

This application is a U.S. National Stage Entry under 35 U.S.C. § 371 of International Application No.: PCT/US2023/018394 filed Apr. 12, 2023, which claims priority to Japan Patent Application No.: 2022-096228, filed Jun. 15, 2022, which are hereby incorporated by reference in their entireties.

BACKGROUND

An image forming system may include a conveying device to convey a print medium, a photoreceptor on which an electrostatic latent image is to be formed, a developing device to develop the electrostatic latent image, a transfer device to transfer a toner image on to the print medium, a fixing device to fix the toner image to the print medium, and an output device to discharge the print medium. The fixing device is to heat and press a sheet on to which a toner image is transferred, to fix the toner image to the sheet.

BRIEF DESCRIPTION OF THE DRAWINGS

Various examples will be described below by referring to the following figures.

DETAILED DESCRIPTION

Figure 1:
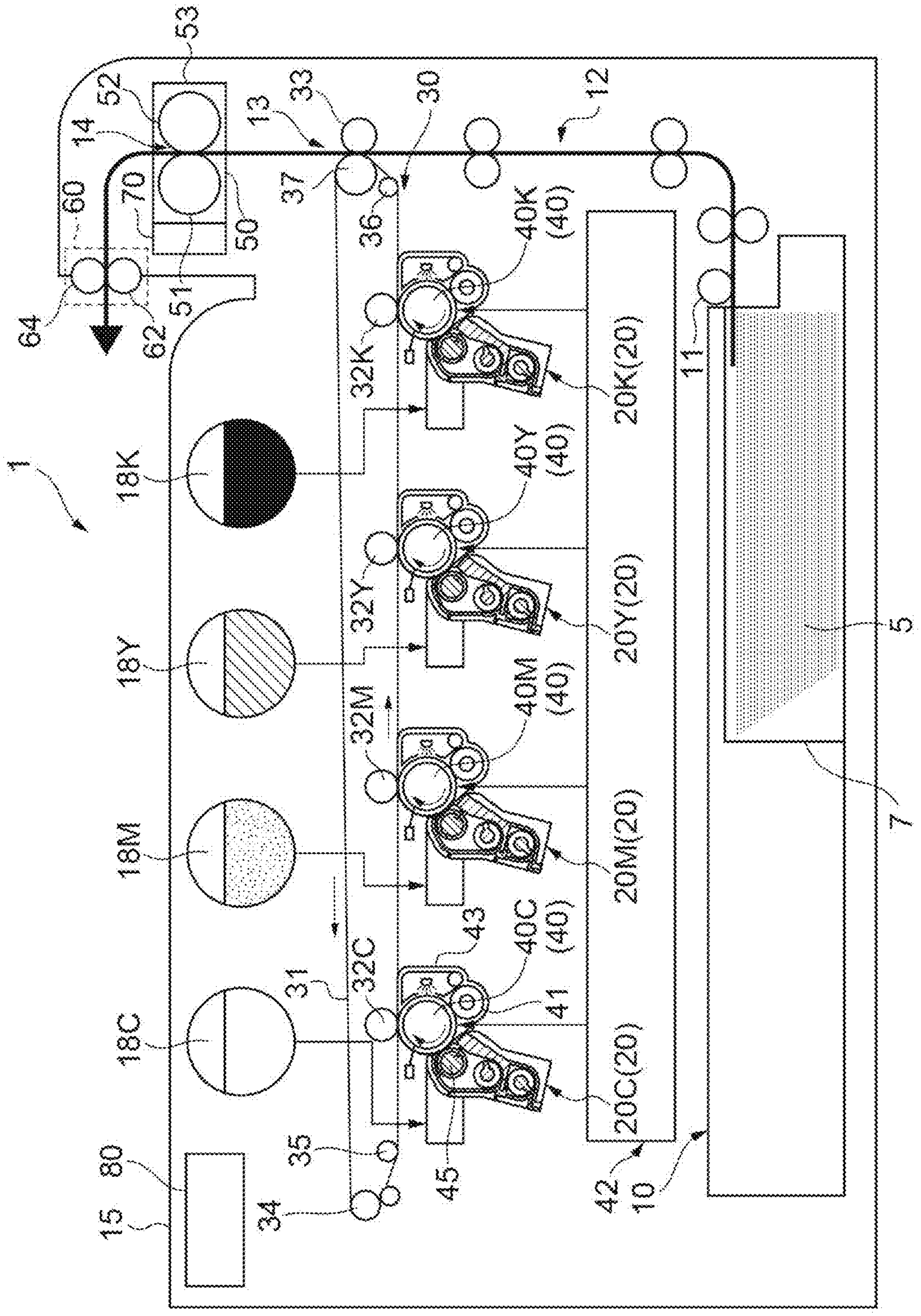
FIG. 1 is a schematic view of an image forming apparatus according to an example.

Hereinafter, examples of a cooling device, a fixing device including the cooling device, and an image forming apparatus including the fixing device will be described with reference to the drawings. In the following description based on the drawings, the same elements or elements having the same function are denoted by the same reference signs, and a duplicated description will not be repeated. The depiction of the drawings may be partially simplified or exaggerated for ease of understanding, and dimensional ratios, angles, and the like are not limited to those specified in the drawings.

In various examples, an image forming apparatus may refer to any of a variety of devices, such as a printer, a copier, a scanner, a facsimile machine, a multi-function product (MFP), a display device, and the like, that are capable of performing an image forming job. The image forming apparatus includes a fixing device to fix a toner image to a print medium. As will be described later, the fixing device includes a fixing belt including a heating element, and a pressure roller to contact the fixing belt. Based on a print medium (e.g., a sheet) on to which a toner image is transferred passing through a fixing nip region formed between the fixing belt and the pressure roller, the sheet is heated and pressed. As a result, the toner image that is transferred on to the sheet is fixed to the sheet.

The image forming apparatus may be able to form an image on sheets of different sizes. In a situation in which a sheet of a small size passes through the fixing nip region, a non-contact region where the sheet does not contact the fixing belt is formed. As an example, the non-contact region may be located at an end or edge of the fixing belt. Since heat is not taken away by the sheet on the non-contact region of the fixing belt, the temperature of the non-contact region may increase excessively. In an example, a cooling device of the fixing device is provided to cool the non-contact region of the fixing belt to prevent the fixing belt from being excessively heated.

FIG. 1 is a view schematically illustrating an image forming apparatus according to an example. An image forming apparatus 1 illustrated in FIG. 1 may form an image using each color of cyan, magenta, yellow, and black. The image forming apparatus 1 includes a conveying device 10 to convey a sheet 5 of a print medium, a plurality of developing devices 20C, 20M, 20Y, and 20K (hereinafter, unless to distinguish between individual components, referred to as a "developing device 20") to develop electrostatic latent images, a transfer device 30 to secondarily transfer a toner image of each color on to the sheet 5, a plurality of photoreceptors 40C, 40M, 40Y, and 40K (hereinafter, unless to distinguish between individual components, referred to as a "photoreceptor 40") on respective surfaces of which the electrostatic latent images are to be formed, a fixing device 50 to fix layered toner images to the sheet 5, and an output device 60 to discharge the sheet 5. The conveying device 10, the developing device 20, the transfer device 30, the photoreceptor 40, the fixing device 50, and the output device 60 are accommodated in a housing 15 of the image forming apparatus 1.

The conveying device 10 is to convey the sheet 5, which is a print medium on which an image is to be formed, on to a conveyance path 12. The sheets 5 are stacked and accommodated in a cassette 7 and are picked up and conveyed by a sheet feeding roller 11. The conveying device 10 is to cause the sheet 5 to reach a transfer region 13 via the conveyance path 12 at a timing at which the toner images to be transferred on to the sheet 5 reach the transfer region 13.

The developing devices 20C, 20M, 20Y, and 20K are provided for the respective colors. Each of the developing devices 20 includes a developing roller 45 to carry toner to the photoreceptor 40. In the developing device 20, a two-component developer containing toner and a carrier may be used as a developer. As an example, in the developing device 20, the toner and the carrier may be adjusted in amount to a desired mixing ratio and may be additionally mixed and stirred so that the developer in which the toner is uniformly dispersed and to which an optimal charge amount is imparted may be adjusted. The developing roller 45 is to carry the developer. Based on the developing roller 45 rotating to convey the developer to a developing region where the developer faces the photoreceptor 40, the toner contained in the developer carried on the developing roller

45 moves to the electrostatic latent image formed on a peripheral surface of the photoreceptor 40, to develop the electrostatic latent image.

The transfer device 30 is to convey the toner image formed by the developing device 20 to the transfer region 13 where the toner image may be secondarily transferred on to the sheet 5. The transfer device 30 may include an intermediate transfer belt 31 on to which the toner image is to be primarily transferred from the photoreceptor 40, a tension roller 34 to impart tension to the intermediate transfer belt 31, idler rollers 35 and 36, a drive roller 37 to drive the intermediate transfer belt 31, primary transfer rollers 32C, 32M, 32Y, and 32K respectively located opposite to the photoreceptors 40C, 40M, 40Y, and 40K to nip the intermediate transfer belt 31 together with the photoreceptors 40C, 40M, 40Y, and 40K, and a secondary transfer roller 33 located opposite to the drive roller 37 to nip the intermediate transfer belt 31 together with the drive roller 37.

Each of the photoreceptors 40C, 40M, 40Y, and 40K may also be referred to as an electrostatic latent image carrier, a photosensitive drum, or the like. The photoreceptors 40C, 40M, 40Y, and 40K are provided for the respective colors. The photoreceptors 40 are provided along a movement direction of the intermediate transfer belt 31. The developing device 20, a charging device 41, an exposure unit 42, and a cleaning device 43 are provided on a periphery of the photoreceptor 40.

The charging device 41 may include, for example, a charging roller to contact the photoreceptor 40 to uniformly charge the surface of the photoreceptor 40 to a predetermined potential. The exposure unit 42 is to expose the surface of the photoreceptor 40, charged by the charging device 41, to light according to an image to be formed on the sheet 5. Accordingly, a portion of the surface of the photoreceptor 40 exposed to light by the exposure unit 42 changes in potential to form the electrostatic latent image. The developing devices 20C, 20M, 20Y, and 20K develop the electrostatic latent images formed on the photoreceptors 40 with toners supplied from toner tanks 18C, 18M, 18Y, and 18K provided to face the respective developing devices 20, to generate the toner images. The toner tanks 18C, 18M, 18Y, and 18K may be filled with cyan, magenta, yellow, and black toners, respectively. The cleaning device 43 is to collect toner that has remained on the photoreceptor 40 after the toner image formed on the photoreceptor 40 is primarily transferred on to the intermediate transfer belt 31.

The fixing device 50 is to fix the toner image that is secondarily transferred on to the sheet 5 from the intermediate transfer belt 31, to the sheet 5 based on the sheet 5 passing through a fixing nip region 14. The fixing device 50 includes a fixing belt 51, a pressure roller 52 that is pressed against an outer peripheral surface of the fixing belt 51, and a casing 53 to accommodate the fixing belt 51 and the pressure roller 52. The fixing belt 51 includes a heating body to be heated by a heating element. The fixing nip region 14 is located between the fixing belt 51 and the pressure roller 52. Based on the sheet 5 passing through the fixing nip region 14, the toner image is melted and fixed to the sheet 5.

The output device 60 includes output rollers 62 and 64 to discharge the sheet 5 to which the toner image is fixed by the fixing device 50, to the outside of the apparatus.

The image forming apparatus 1 further includes a controller 80. The controller 80 may include a computer having a processor, a storage unit (i.e., a memory), an input device, a display device, and the like, and may control an overall operation of the image forming apparatus 1. The storage unit of the controller 80 stores a control program to cause the processor to control various operations to be executed by the image forming apparatus 1.

Figure 2:
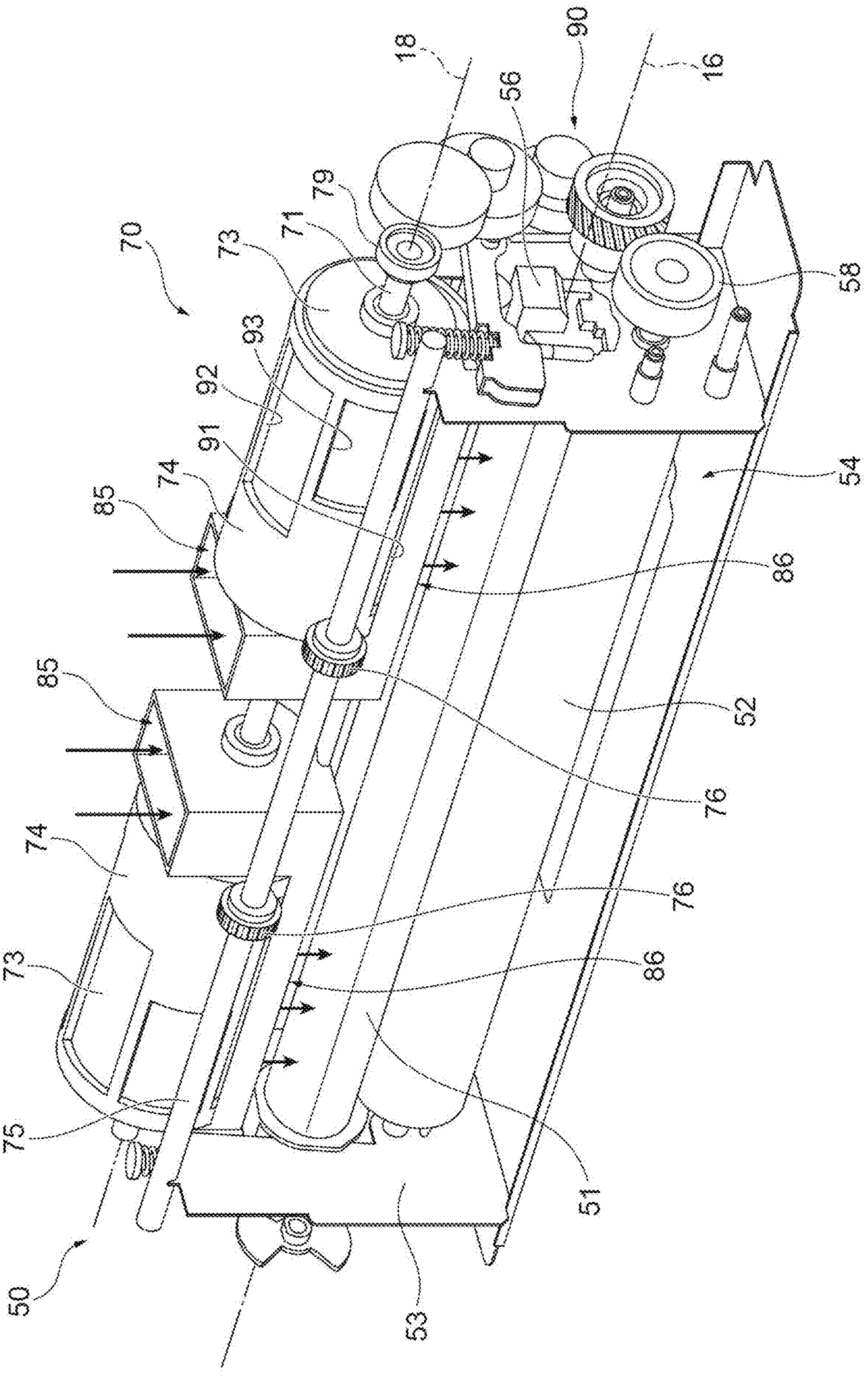
FIG. 2 is a perspective view illustrating a fixing device including a cooling device according to an example.
Figure 3:
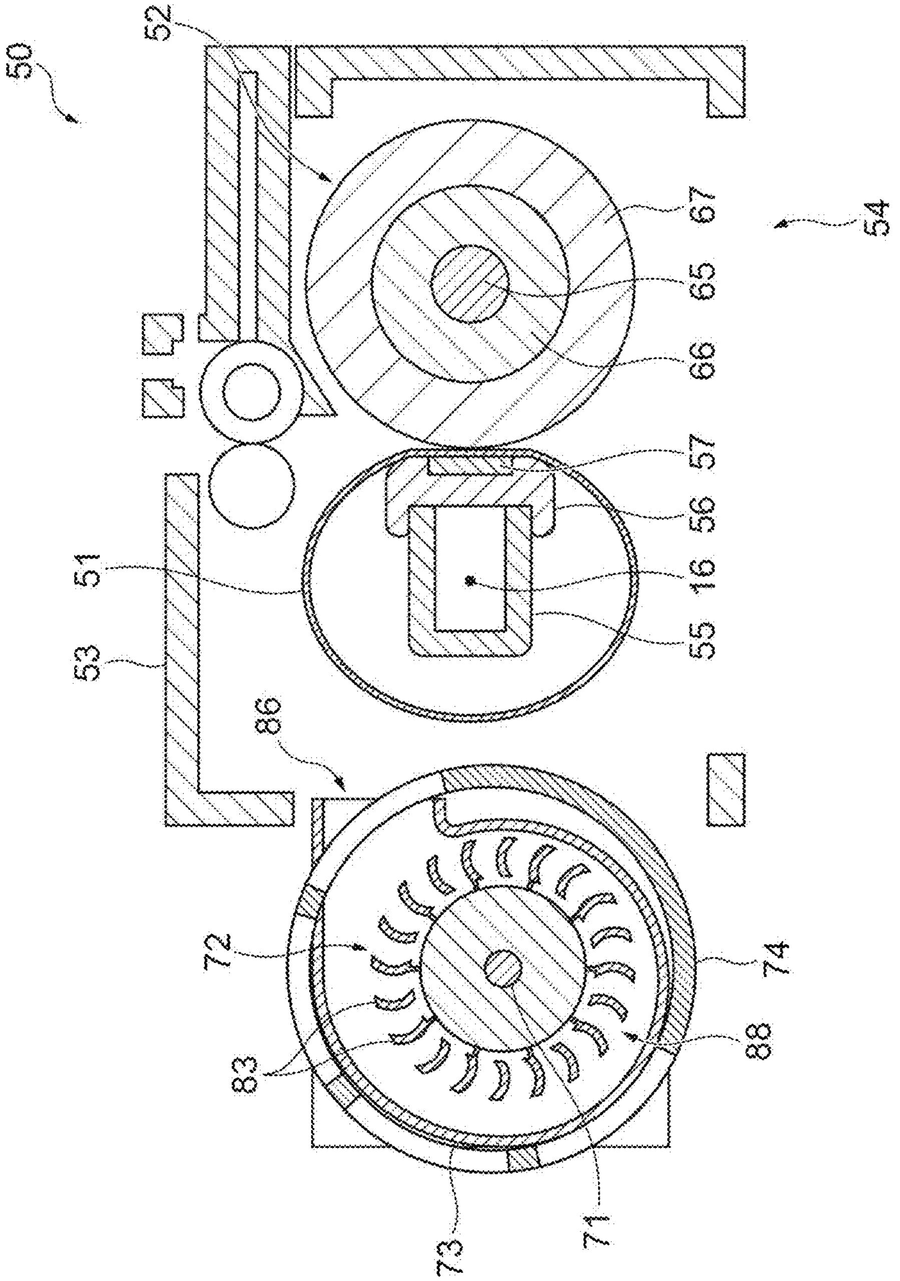
FIG. 3 is a schematic cross-sectional view of the fixing device of FIG. 2 according to an example.

FIG. 2 is a perspective view illustrating the fixing device 50 including a cooling device according to an example. FIG. 3 is a schematic cross-sectional view illustrating the fixing device 50 according to an example. The fixing device 50 includes a fixing unit 54 to fix layered toner images to the sheet 5, and a cooling device 70 to cool a part of the fixing belt 51 of the fixing unit 54.

The fixing unit 54 includes the fixing belt 51, the pressure roller 52, and the casing 53. The fixing belt 51 may include a belt having a substantially cylindrical shape extending along a rotation axis 16. In an example, the fixing belt 51 includes an elastically deformable material. The fixing belt 51 may be supported by the casing 53 to be rotatable around the rotation axis 16. As illustrated in FIG. 3, a support member 55, a heat insulating member 56, and a heating element 57 may be provided inside the fixing belt 51.

The support member 55 may include a long metal member extending in parallel to the rotation axis 16 of the fixing belt 51, and may include, for example, a U-shaped cross-sectional shape. Opposite ends of the support member 55 are supported by the heat insulating member 56. The heat insulating member 56 may include, for example, a resin material having a heat insulating property, and may be fixed to or guided by the casing 53. The heating element 57 may be fixed to the heat insulating member 56 between the heat insulating member 56 and the fixing belt 51. The heating element 57 may include, for example, a ceramic heater and may receive electric power from a power source (not illustrated) to generate heat. The fixing belt 51 may be heated by the heat generated by the heating element 57. The controller 80 is to control the electric power to be supplied from the power source to the heating element 57, to control the temperature of the heating element 57. In an example, the image forming apparatus 1 may include a solid fixing roller instead of the fixing belt 51 having a substantially cylindrical shape.

The pressure roller 52 may be disposed adjacent to the fixing belt 51. The pressure roller 52 may have a substantially cylindrical shape or a substantially circular tubular shape and extend in parallel to the rotation axis 16 of the fixing belt 51. The pressure roller 52 may include, for example, an iron core 65, an elastic layer 66, and a release layer 67. The iron core 65 may include, for example, a metal material. The iron core 65 may extend in parallel to the rotation axis 16 of the fixing belt 51, and opposite ends of the iron core 65 may be rotatably supported by the casing 53 of the fixing device 50. The elastic layer 66 may include an elastically deformable material and cover an outer peripheral surface of the iron core 65. The release layer 67 may include a resin composition and cover an outer peripheral surface of the elastic layer 66. The pressure roller 52 may press against the fixing belt 51 to form the fixing nip region 14 between the fixing belt 51 and the pressure roller 52.

A gear 58 may be provided at one end of the pressure roller 52. The gear 58 of the pressure roller 52 may be connected to a drive motor. A driving force of the drive motor may be transmitted to the pressure roller 52 through the gear 58 to rotate the pressure roller 52. The pressure roller 52 may be pressed against the fixing belt 51 to rotate, so that the fixing belt 51 is driven to rotate. At this time, the fixing belt 51 may rotate while sliding with respect to the heating element 57. The controller 80 may control the operation of the drive motor to control the rotational speed of the pressure roller 52.

The cooling device 70 may include a shaft 71, a pair of blade devices 72, a pair of housings 73, and a pair of shutters 74. The shaft 71 may be disposed adjacent to the fixing belt 51 of the fixing device 50 and extend in parallel to the rotation axis 16 of the fixing belt 51. The shaft 71 may include, for example, a long metal member and be rotatably supported by the casing 53 of the fixing device 50. The shaft 71 may rotate around a rotation axis 18 in parallel to the rotation axis 16 of the fixing belt 51.

Figure 4:
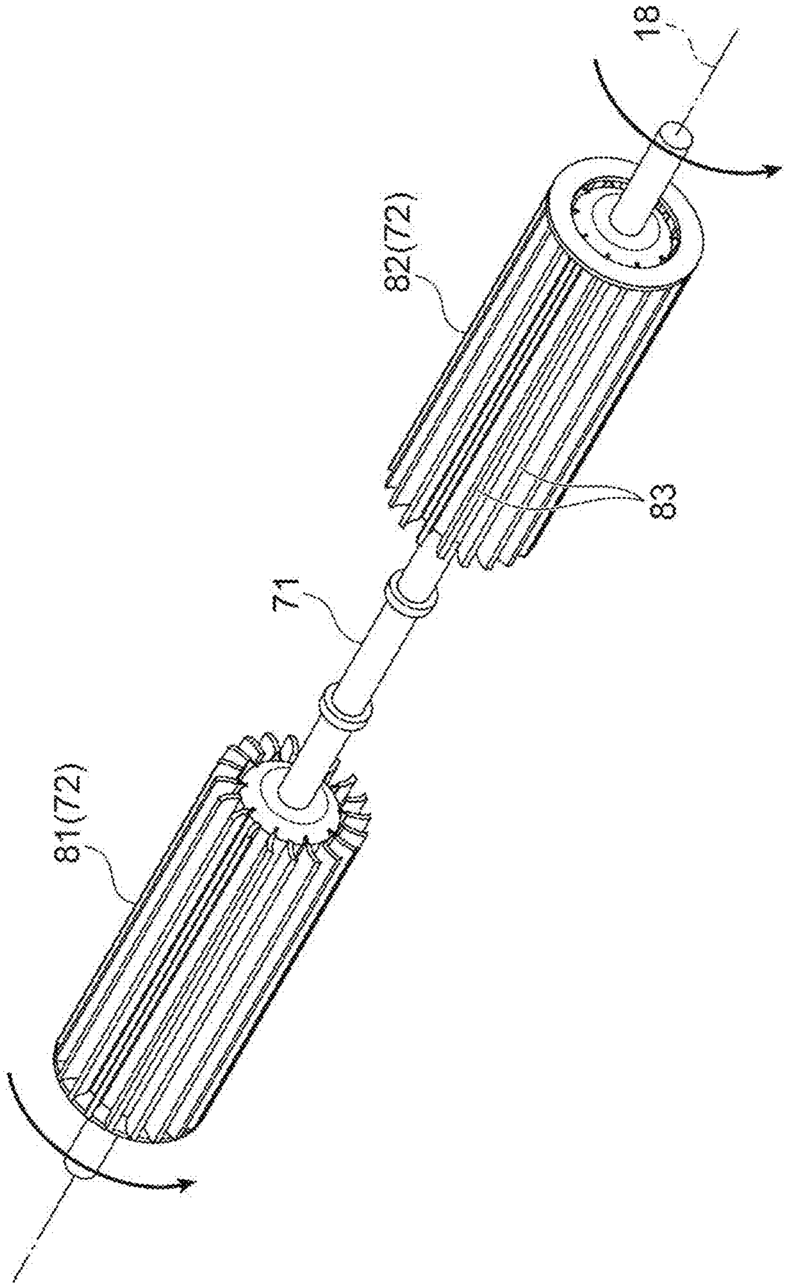
FIG. 4 is a perspective view illustrating a pair of blade devices coupled to a shaft according to an example.

The shaft 71 may be provided with the pair of blade devices 72. FIG. 4 is a perspective view illustrating the pair of blade devices 72 coupled to the shaft 71 according to an example. The pair of blade devices 72 may include, for example, a heat-resistant resin. As illustrated in FIG. 4, the pair of blade devices 72 may include a first blade device 81 connected to a first end of the shaft 71, and a second blade device 82 coupled to a second end of the shaft 71 opposite the first end. In the following description, the first blade device 81 and the second blade device 82 are collectively referred to as the blade device 72 unless to distinguish therebetween.

The pair of blade devices 72 may include a blade to generate a flow of air. For example, the pair of blade devices 72 are multi-blade fans each including a plurality of blades. The multi-blade fan includes a sirocco fan. As an example, as illustrated in FIG. 4, each of the pair of blade devices 72 includes a plurality of blades 83 extending radially from the shaft 71 and extending in parallel to the rotation axis 18 of the shaft 71. The pair of blade devices 72 are to rotate around the rotation axis 18 in response to the rotation of the shaft 71 to generate a flow of air in a tangential direction of a circumference around the rotation axis 18.

In an example as illustrated in FIG. 3, in consideration of a direction parallel to the rotation axis 18, each of the plurality of blades 83 may have a main surface that is curved to bulge opposite a rotational direction around the rotation axis 18. Since the plurality of blades 83 are curved in such a manner, a flow of air is efficiently generated.

A gear 79 may be provided at one end of the shaft 71. A drive transmission unit 90 may be provided between the gear 58 of the pressure roller 52 and the gear 79 of the shaft 71. The drive transmission unit 90 may transmit a rotational driving force of the pressure roller 52 generated by the drive motor to the shaft 71. For example, the drive transmission unit 90 may include a plurality of gears to transmit the rotational driving force of the pressure roller 52 and the plurality of gears may have a speed transmission ratio that adjusts the rotational speed of the shaft 71 to a desired rotational speed. The driving force of the drive motor may be distributed to the pressure roller 52 and to the shaft 71 of the cooling device 70 by the drive transmission unit 90 to rotate the pressure roller 52 and the shaft 71. Since the fixing device 50 includes the drive transmission unit 90, the pressure roller 52 and the shaft 71 are rotatable by one drive motor, so that the number of components of the fixing device 50 can be reduced. In an example, the fixing device 50 may include an independent drive motor to drive the shaft 71, instead of including the drive transmission unit 90.

Figure 5:
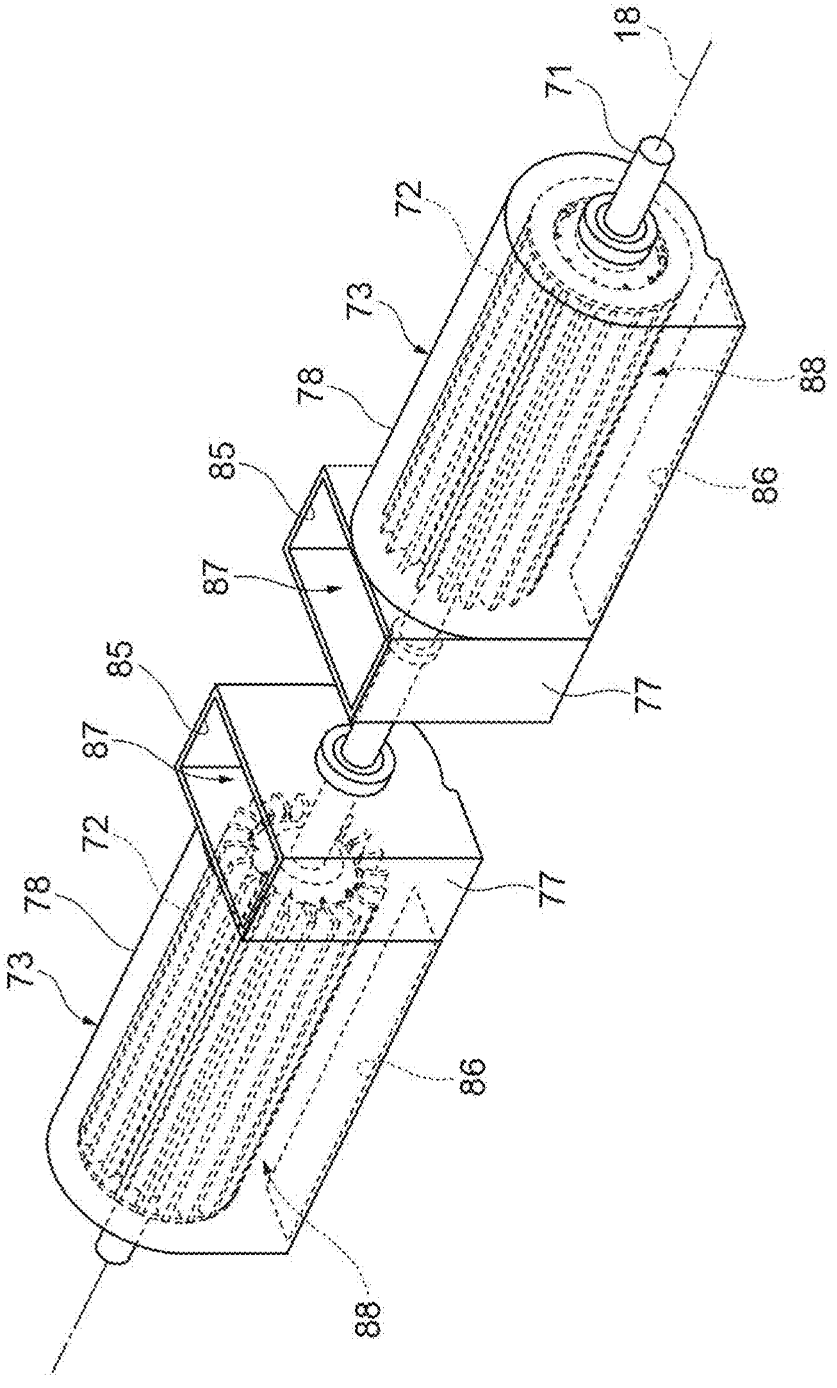
FIG. 5 is a perspective view of a pair of housings according to an example.

The pair of blade devices 72 may be accommodated in the pair of respective housings 73. FIG. 5 is a perspective view of the pair of housings 73 according to an example. As illustrated in FIG. 5, the pair of housings 73 may be disposed to be separated from each other in an axial direction of the rotation axis 18. The pair of housings 73 may include, for example, a heat-resistant resin. Each of the pair of housings 73 may include an inlet 85 to draw in air, and an outlet 86 to open toward the fixing belt 51 of the fixing device 50.

In addition, each of the housings 73 may include an introduction portion 77 and an accommodation portion 78. The introduction portion 77 may have a substantially angled tubular shape extending in direction perpendicular to the rotation axis 18 of the shaft 71, and form an introduction path 87 of air inside the introduction portion 77. The accommodation portion 78 may be disposed on an end side of the shaft 71 with respect to the introduction portion 77 in the axial direction of the rotation axis 18. The accommodation portion 78 may have a substantially cylindrical shape extending along the rotation axis 18, and form an accommodation space 88 to accommodate the blade device 72. The accommodation space 88 is to communicate with the introduction path 87.

The inlet 85 of each of the housings 73 may be located at a position that is further separated from the fixing belt 51 than the outlet 86, for example, at an upper portion of the introduction portion 77. The outlets 86 of the pair of housings 73 may be located, for example, in lower portions of the respective accommodation portions 78. The outlets 86 of the housings 73 may be at least partially aligned with the pair of respective blade devices 72 to extend in parallel to the rotation axis 18. The inlet 85 of each of the housings 73 may be located at a position that is offset with respect to the outlet 86 in the direction parallel to the rotation axis 18 of the shaft 71. The inlet 85 of each of the housings 73 is to communicate with the outlet 86 through the introduction path 87 and through the accommodation space 88.

Based on the pair of blade devices 72 rotating around the rotation axis 18 in the respective accommodation spaces 88, the accommodation spaces 88 will have a negative pressure, and air is drawn in from the inlets 85 of the housings 73. The air that is drawn in from the inlets is to flow through the introduction paths 87 in the direction perpendicular to the rotation axis 18, be diverted in the direction parallel to the rotation axis 18 at lower portions of the introduction paths 87, and be introduced to the accommodation spaces 88. The air introduced to the accommodation spaces 88 may be directed in a direction substantially perpendicular to the rotation axis 18 of the shaft 71 by the pair of blade devices 72, and may be discharged from the outlets 86 toward opposite ends of the fixing belt 51.

As illustrated in FIG. 2, the pair of shutters 74 may have a substantially cylindrical shape and be disposed to surround the accommodation portions 78 of the pair of respective housings 73. The pair of shutters 74 may adjust an opening area of the outlets 86 of the pair of respective housings 73. As illustrated in FIG. 2, a plurality of openings 91, 92, and 93 having different areas may be located in each of the pair of shutters 74. The plurality of openings 91, 92, and 93 may be located at positions that are separated from each other in a circumferential direction of the shutter 74.

The plurality of openings 91, 92, and 93 may include, for example, rectangular openings and extend in the direction parallel to the rotation axis 18 of the shaft 71. Each of the plurality of openings 91, 92, and 93 has a first end and second end in the direction parallel to the rotation axis 18. The first end may be disposed outside the second end in the direction along the rotation axis 18 of the shaft 71. As illustrated in FIG. 2, the positions of the first ends of the plurality of openings 91, 92, and 93 may be aligned in the direction parallel to the rotation axis 18. On the other hand, the second ends of the plurality of openings 91, 92, and 93 may be disposed at different positions in the direction parallel to the rotation axis 18. As an example, in the direction parallel to the rotation axis 18, the second end of the opening 91 may be disposed inside the second end of the opening 92, and the second end of the opening 92 may be disposed inside the second end of the opening 93.

Therefore, in the direction parallel to the rotation axis of the shaft 71, a length of the opening 91 may be longer than a length of the opening 92, and the length of the opening 92 may be longer than a length of the opening 93. Namely, the areas of the plurality of openings 91, 92, and 93 decrease in order of the openings 91, 92, and 93.

The cooling device 70 may further include a shaft 75 that is adjacent to the shaft 71 and that extends in parallel to the rotation axis 18 of the shaft 71. The shaft 75 may be rotatably supported by the casing 53 of the fixing device 50. The shaft 75 may be coupled to the drive motor and may be rotated by the driving force of the drive motor. The shaft 75 may be provided with a pair of rotating gears 76 to engage the shutters 74. The pair of rotating gears 76 are to rotate in response to the rotation of the shaft 75 to rotate the pair of shutters 74 around the rotation axis 18. The controller 80 is to control the operation of the drive motor to control the rotation angle of the shutters 74.

In an example, the controller 80 is to control the rotation angle of the shutters 74 according to the size of the sheet 5 passing through the fixing nip region 14, to adjust the opening area of the outlets 86 of the housings 73. As described above, based on the sheet 5 having a small width passing through the fixing nip region 14, a non-contact region where the sheet 5 does not contact a longitudinal end of the fixing belt 51 is formed. Since heat is not taken away by the sheet 5 on the non-contact region, the temperature of the fixing belt 51 may increase excessively. The cooling device 70 of the fixing device 50 is to cool the non-contact region of the fixing belt 51 to prevent the fixing belt 51 from being excessively heated. The controller 80 is to adjust the opening area of the outlets 86 to supply air toward the non-contact region of the fixing belt 51 and to selectively cool the non-contact region.

Figure 6A:
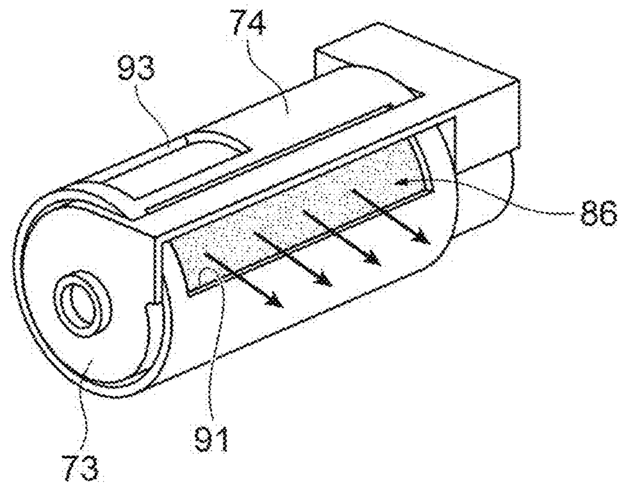
FIGS. 6A to 6C are perspective views illustrating an operation of a shutter according to an example.
Figure 6B:
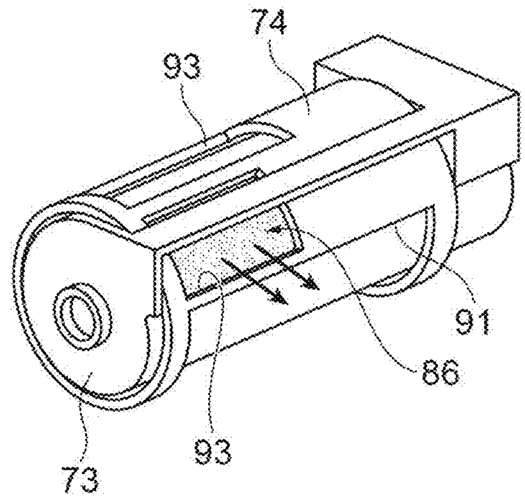
Figure 6C:
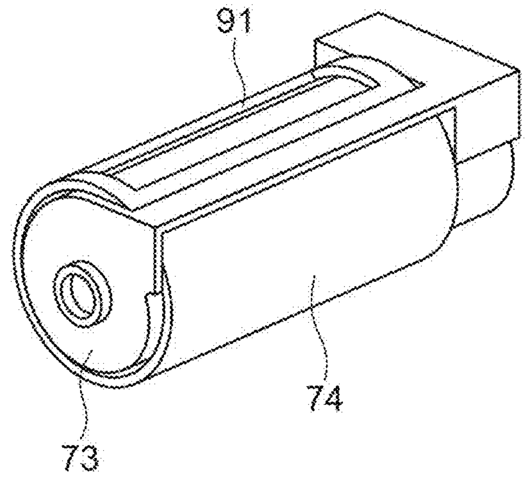

FIGS. 6A to 6C are perspective views illustrating an operation of a shutter according to an example. In an example, based on the sheet 5 having a first width smaller than an overall length of the fixing belt 51 passing through the fixing nip region 14, relatively large non-contact regions are formed at the opposite ends of the fixing belt 51. In this case, as illustrated in FIG. 6A, the controller 80 causes the shutter 74 to rotate such that the outlet 86 of the housing 73 and the opening 91 of the shutter 74 are aligned. Accordingly, the outlets 86 of the pair of housings 73 open toward the fixing belt 51, and air is supplied from the outlets 86 of the pair of housings 73 toward the non-contact regions of the fixing belt 51 in response to the rotation of the pair of blade devices 72. As a result, the non-contact regions of the fixing belt 51 are selectively cooled.

Based on the sheet 5 having a second width that is smaller than the overall length of the fixing belt 51 and that is larger than the first width passing through the fixing nip region 14, relatively small non-contact regions are formed at the opposite ends of the fixing belt 51. In this case, as illustrated in FIG. 6B, the controller 80 causes the shutter 74 to rotate such that the outlet 86 of the housing 73 and the opening 93 of the shutter 74 are aligned. Since the area of the opening 93 is smaller than the area of the opening 91, based on the openings 93 of the shutters 74 being disposed above the respective outlets 86, a part of the outlets 86 of the pair of housings 73 is exposed toward the fixing belt 51. Accordingly, the opening area of the outlets 86 of the housings 73 is limited. Therefore, air is supplied from the outlets 86 of the pair of housings 73 toward the non-contact regions of the fixing belt 51 in response to the rotation of the pair of blade devices 72. As a result, the non-contact regions of the fixing belt 51 are selectively cooled.

Based on the sheet 5 having a third width that is the same as the overall length of the fixing belt 51 passing through the fixing nip region 14, a non-contact region is not formed at the opposite ends of the fixing belt 51. In this case, as illustrated in FIG. 6C, the controller 80 causes the shutter 74 to rotate such that the outlet 86 of the housing 73 is covered with a wall surface of the shutter 74. Accordingly, the outlets 86 of the pair of housings 73 are closed, and the supply of air from the outlets 86 of the pair of housings 73 to the fixing belt 51 is stopped. As described above, the controller 80 is to control the rotation angle of the shutters 74 to adjust the opening area of the outlets 86 of the pair of housings 73 so that the cooling range of the fixing belt 51 is adjusted.

The example fixing device 50 described above includes the pair of housings 73 to accommodate the pair of respective blade devices 72, and the inlet 85 to draw in air and the outlet 86 facing one of the opposite ends of the fixing belt 51 are located in each of the pair of housings 73. Therefore, a flow of air generated by the rotation of the pair of blade devices 72 can be supplied toward the non-contact regions formed at the opposite ends of the fixing belt 51 to selectively cool the non-contact regions of the fixing belt 51.

In an example, a flow of air generated by multi-blade fans such as the pair of blade devices 72 may be more straightened (i.e., linear) than a flow of air generated by typical axial fans. Therefore, a flow of air that is straightened without using a straightening duct can be supplied to the fixing belt 51 by using multi-blade fans as the pair of blade devices 72. Therefore, the pair of blade devices 72 can be disposed close to the fixing belt 51, and as a result, the size of the fixing device 50 can be reduced.

In the example illustrated in FIG. 2, the cooling device 70 is to cool the opposite longitudinal ends of the fixing belt 51. However, the cooling device 70 may cool one longitudinal end of the fixing belt 51 without cooling the other longitudinal end of the fixing belt. For example, based on the sheet 5 of a small size passing through the fixing nip region 14, there is a technique of aligning a longitudinal center of the fixing belt 51 with a center of the sheet 5, and a technique of aligning the first end of the fixing belt 51 in a longitudinal direction with an end of the sheet 5. Based on the first end of the fixing belt 51 being aligned with the end of the sheet 5, a non-contact region is located on a second end side of the fixing belt 51 but is not located on the first end side of the fixing belt 51. In this case, the cooling device 70 may supply air to the non-contact region formed on the second end side of the fixing belt 51 and not supply air to the first end side of the fixing belt 51. Based on one end of the fixing belt 51 being cooled and the other end of the fixing belt 51 not being cooled, the cooling device 70 may include one blade device 72 fixed to one end side of the shaft 71, and one housing 73 to accommodate the blade device 72.

Figure 7A:
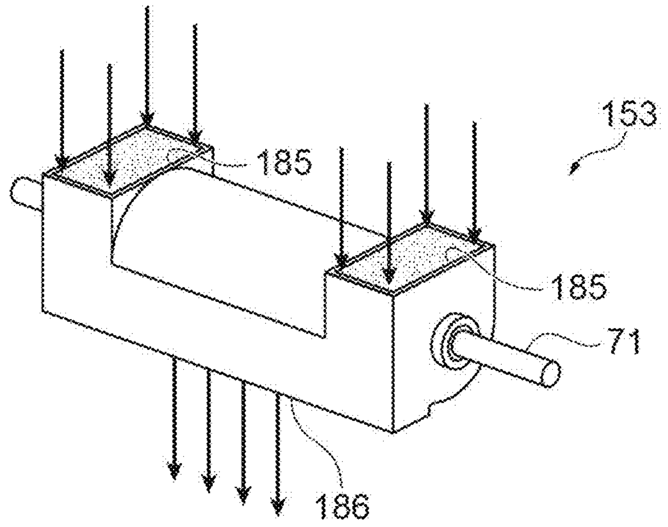
FIGS. 7A and 7B are perspective views illustrating housings according to other examples.

Another example of a housing to accommodate the pair of respective blade devices 72 will be described. Hereinafter, differences from the housing 73 illustrated in FIG. 5 will be described, and a duplicated description will not be repeated. FIG. 7A is a perspective view illustrating a housing 153 according to another example. The housing 153 may include a pair of inlets 185 and one outlet 186. The outlet 186 may be formed between the pair of inlets 185 in the direction parallel to the rotation axis 18 of the shaft 71. Namely, the pair of inlets 185 may be offset with respect to the outlet 186 in the direction parallel to the rotation axis 18. Since the housing 153 has the pair of inlets 185, a larger amount of air can be drawn into the housing 153.

Figure 7B:
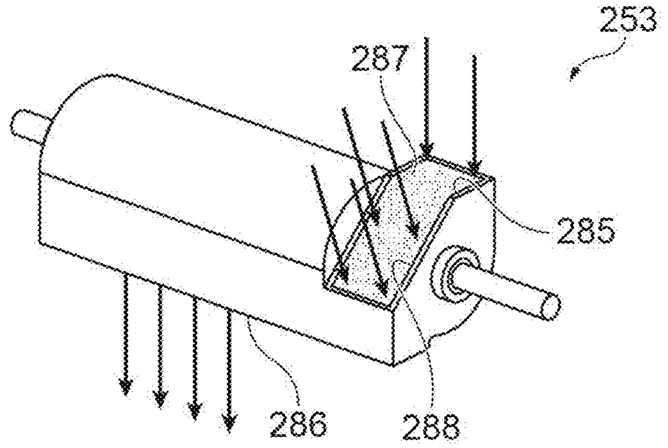

FIG. 7B is a perspective view illustrating a housing 253 according to another example. The housing 253 may have an inlet 285 to draw in air, and an outlet 286 to open toward the fixing belt 51. The inlet 285 of the housing 253 may have a first opening 287 disposed along a plane parallel to the outlet 286, and a second opening 288 that is continuous with the first opening 287 and that is disposed along a plane inclined with respect to the first opening 287. Since the inlet 285 of the housing 253 includes the second opening 288 disposed along a plane that is inclined with respect to the first opening 287, the inlet 285 has a larger opening area than that of the inlet 85 of the housing 73, so that a larger amount of air can be drawn into the housing 253.

Figure 8A:
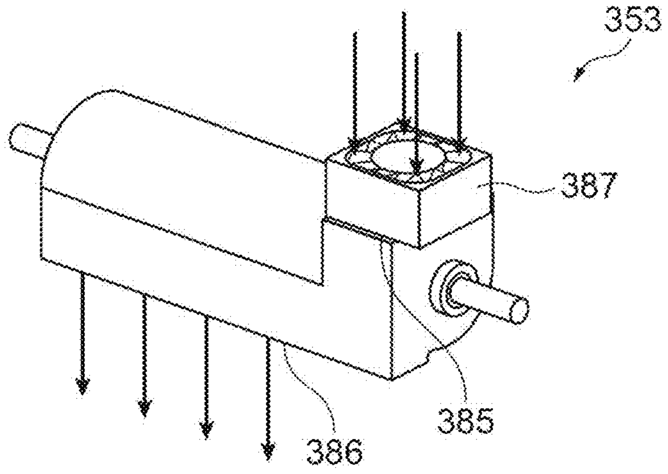
FIGS. 8A and 8B are perspective views illustrating housings according to other examples.

FIG. 8A is a perspective view illustrating a housing 353 according to another example. The housing 353 may include an inlet 385 to draw in air, and an outlet 386 to open toward the fixing belt 51. An intake fan 387 to draw air into the housing 353 may be provided in the inlet 385 of the housing 353. Since the housing 353 includes the intake fan 387, a larger amount of air can be drawn into the housing 353. Therefore, the cooling efficiency of the fixing belt 51 can be improved.

Figure 8B:
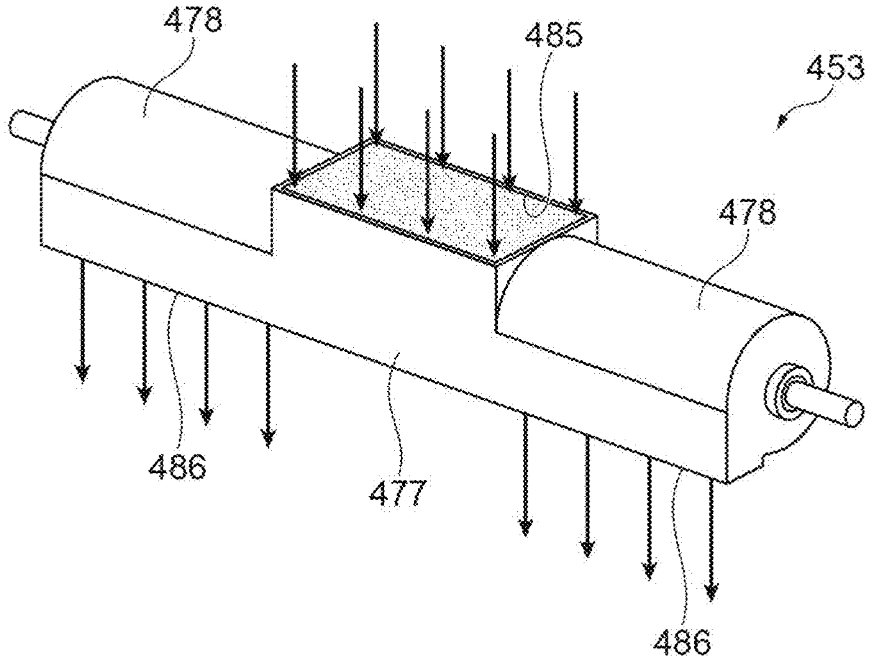

FIG. 8B is a perspective view illustrating a housing 453 according to another example. The housing 453 is different from the housing 73 to accommodate one blade device 72 in that the housing 453 accommodates the pair of blade devices 72. As illustrated in FIG. 8B, the housing 453 includes one introduction portion 477 and a pair of accommodation portions 478. The introduction portion 477 may be disposed between the pair of accommodation portions 478 in the direction parallel to the rotation axis 18 of the shaft 71. The pair of blade devices 72 may be accommodated in the pair of respective accommodation portions 478. An inlet 485 may be located in an upper portion of the introduction portion 477. A pair of outlets 486 to open toward the opposite ends of the fixing belt 51 may be located in lower portions of the pair of respective accommodation portions 478.

In the housing 453, air that is drawn in from the inlet 485 may be distributed to the pair of accommodation portions 478 and be discharged from the pair of outlets 486 toward the opposite ends of the fixing belt 51 in response to the rotation of the pair of blade devices 72. Since the housing 453 accommodates the pair of blade devices 72, the number of components of the fixing device can be reduced.

An example of a shutter to adjust the opening area of the outlet 86 of the housing 73 will be described. Hereinafter, differences from the shutter 74 illustrated in FIGS. 6A to 6C will be described, and a duplicated description will not repeated.

Figure 9A:
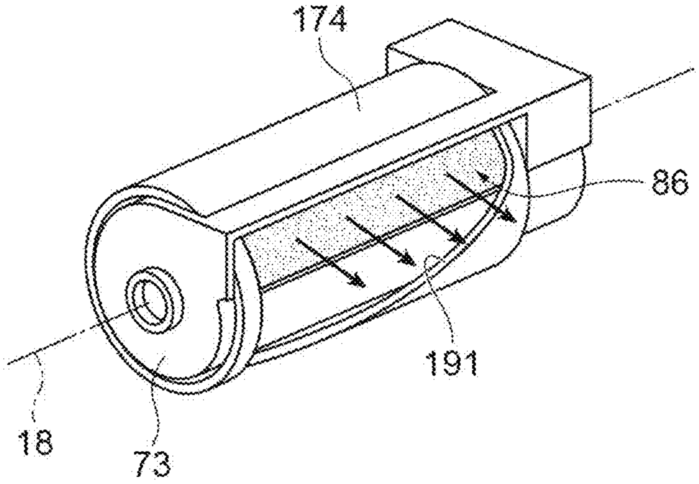
FIGS. 9A to 9C are perspective views illustrating a shutter according to another example.
Figure 9B:
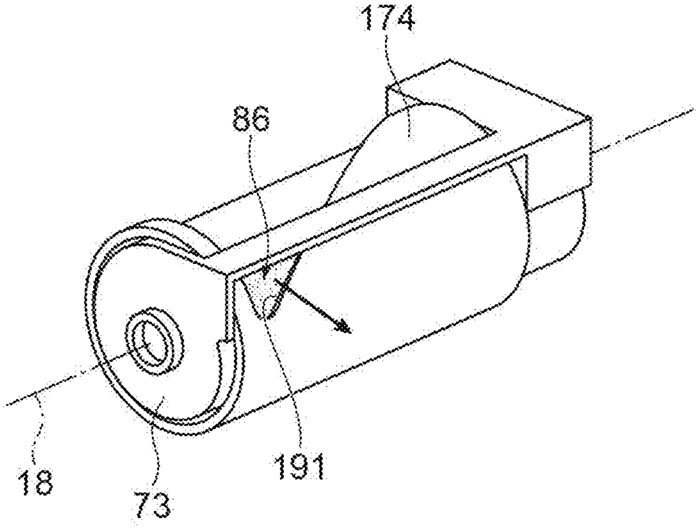
Figure 9C:
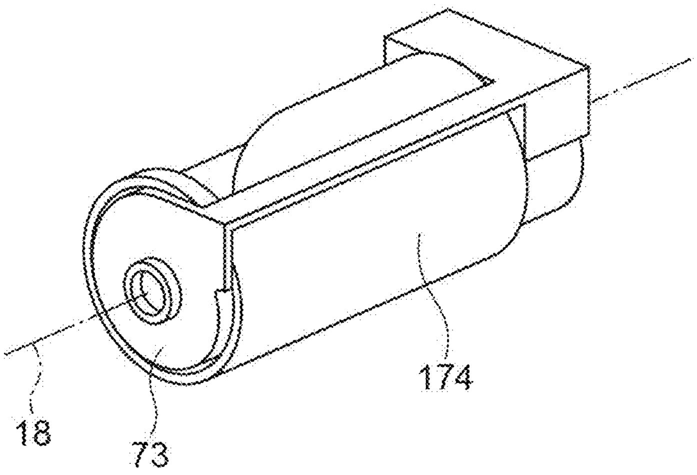

FIGS. 9A to 9C are perspective views illustrating a shutter 174 according to another example. An opening 191 may be located in the shutter 174. A width of the opening 191 of the shutter 174 in the direction parallel to the rotation axis 18 of the shaft 71 may vary depending on the radial position of the shutter 174. In a situation in which the rotation angle of the shutter 174 is changed, an area where the shutter 174 overlaps the outlet 86 of the housing 73 changes. As illustrated in FIGS. 9A to 9C, the opening area of the outlet 86 is steplessly adjustable according to the width of the sheet 5.

Figure 10A:
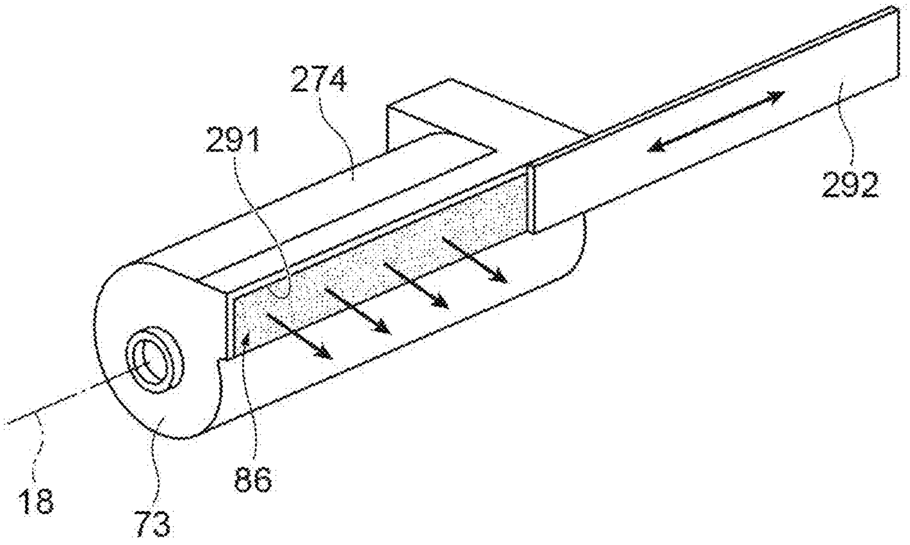
FIGS. 10A to 10C are perspective views illustrating a shutter according to another example.
Figure 10B:
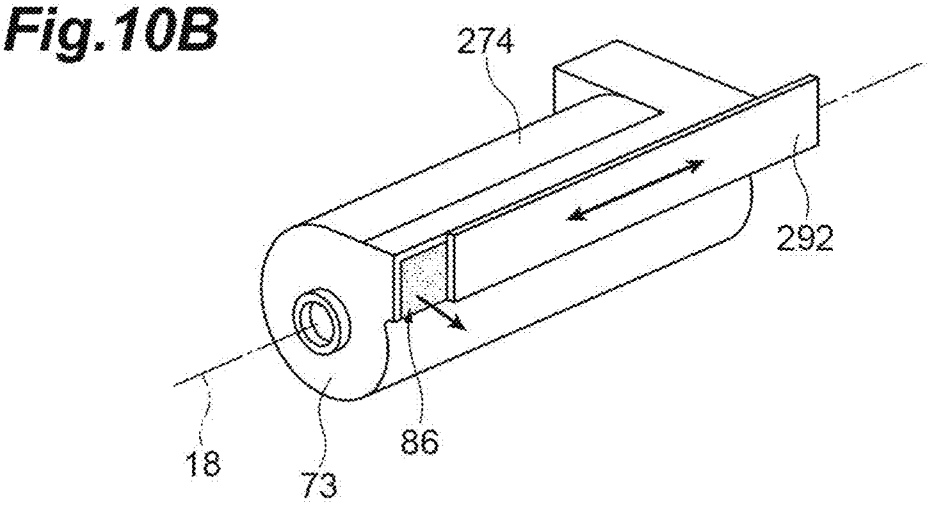
Figure 10C:
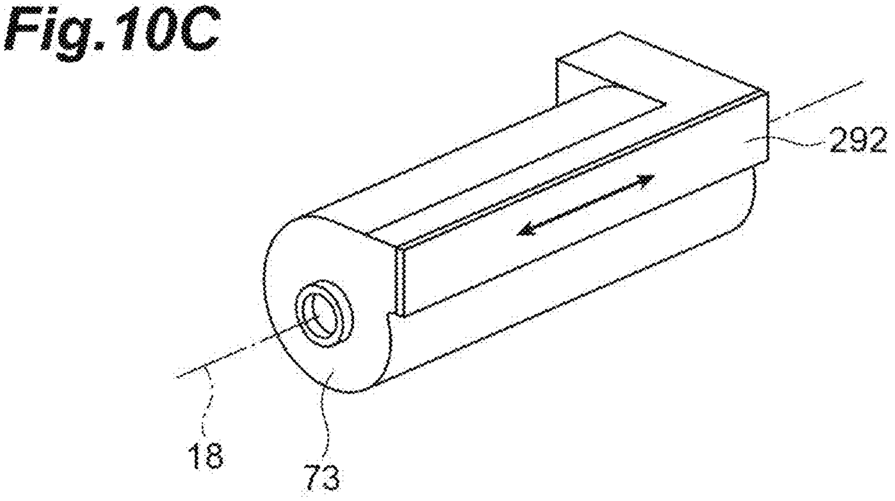

FIGS. 10A to 10C are perspective views illustrating a shutter 274 according to another example. The shutter 274 may have an opening 291 extending in the direction parallel to the rotation axis 18 of the shaft 71. The opening 291 of the shutter 274 may be aligned with the outlet 86 of the housing 73. The shutter 274 may include a plate 292 that is slidable along the opening 291 in the direction parallel to the rotation axis 18. In the shutter 274, as illustrated in FIGS. 10A to 10C, a drive unit (not illustrated) can change the position of the plate 292 to steplessly adjust the opening area of the outlet 86 of the housing 73 according to the width of the sheet 5.

Figure 11A:
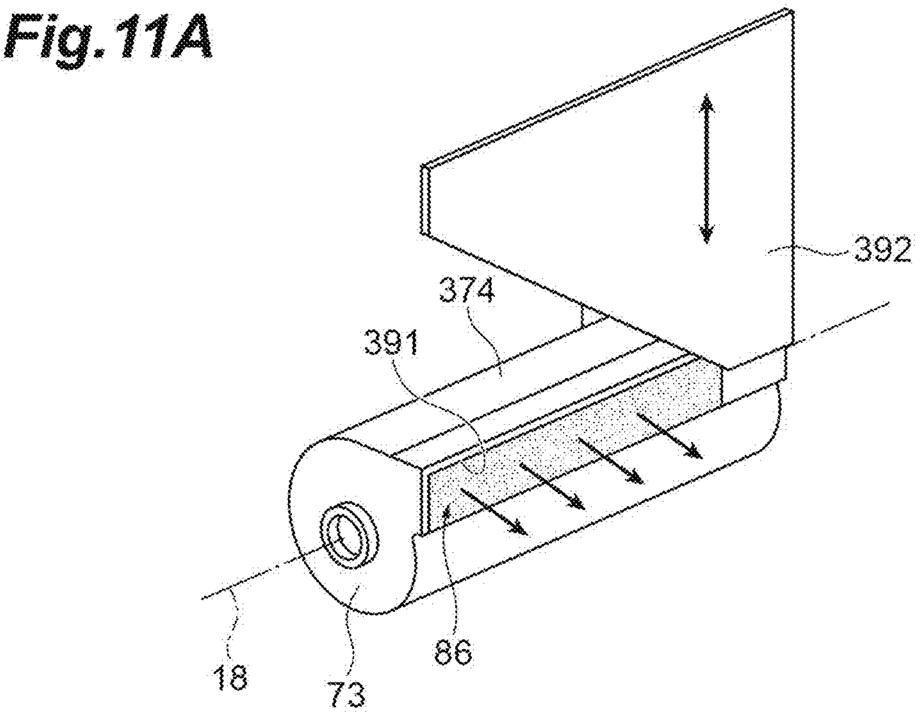
FIGS. 11A to 11C are perspective views illustrating a shutter according to an example.
Figure 11B:
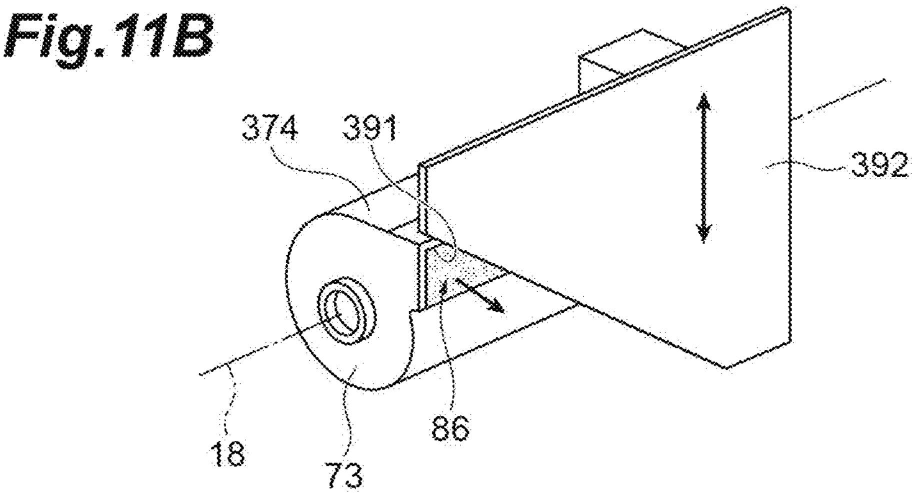
Figure 11C:
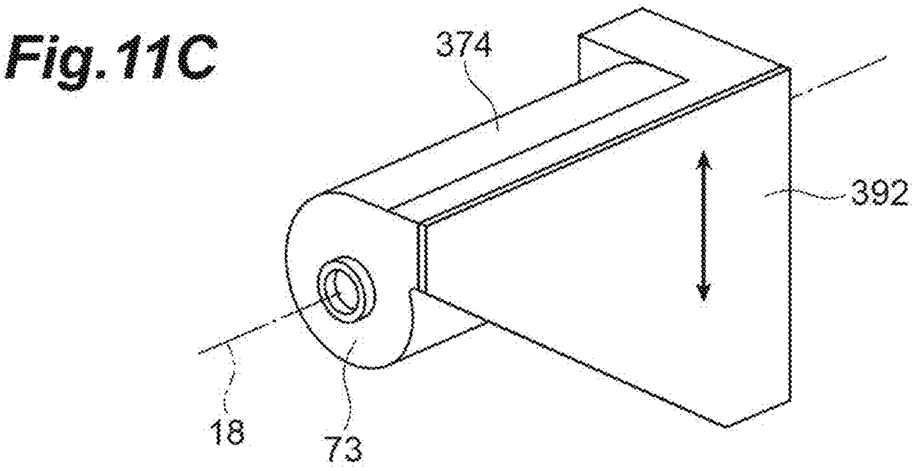

FIGS. 11A to 11C are perspective views illustrating a shutter 374 according to another example. The shutter 374 may have an opening 391 extending in the direction parallel to the rotation axis 18 of the shaft 71. The opening 391 of the shutter 374 may be aligned with the outlet 86 of the housing 73. The shutter 374 may include a plate 392 that is slidable along the opening 391 in an up-down direction perpendicular to the rotation axis 18. A width of the plate 392 in the direction parallel to the rotation axis 18 of the shaft 71 may vary depending on the position in the up-down direction. In the shutter 374, as illustrated in FIGS. 11A to 11C, a drive unit (not illustrated) can change the position of the plate 392 in the up-down direction to change an area where the outlet 86 of the housing 73 and the plate 392 overlap each other. Therefore, in the shutter 374, the opening area of the outlet 86 of the housing 73 is steplessly adjustable according to the width of the sheet 5.

While various examples have been described in the specification, it should be apparent that the dispositions and details can also be changed in other examples. This application includes all changes and modifications included in the concept and scope of the techniques under protection claimed herein.

What is claimed is:

1. A cooling device comprising:
a rotatable shaft;
a pair of blade devices including a first blade device coupled to a first end of the shaft and a second blade device coupled to a second end of the shaft opposite the first end; and
a housing to accommodate the blade device,
wherein the housing includes an inlet to draw in air and an outlet disposed to direct the air toward a heating body of a fixing device; and
a drive transmission member to transmit a driving force of a pressure roller of the fixing device to the shaft to rotate the shaft.

2. The cooling device according to claim 1,
wherein the shaft extends along a rotation axis, and
wherein the outlet of the housing is at least partially aligned with the blade device along the rotation axis to direct a flow of the air in a direction substantially perpendicular to the rotation axis of the shaft.

3. The cooling device according to claim 1, wherein the blade device includes a plurality of the blades extending radially from the shaft and extending parallel to a rotation axis of the shaft.

4. The cooling device according to claim 1, wherein the inlet of the housing is located at a position that is offset with respect to the outlet in a direction along a rotation axis of the shaft.

5. The cooling device according to claim 1, further comprising:
a shutter to adjust an opening area of the outlet of the housing.

6. A fixing device comprising:
a fixing unit including a rotatable heating body and a pressure roller that is rotatably pressed against the heating body; and a cooling device including:
a shaft that rotatably extends adjacent to the fixing unit;
a pair of blade devices including a first blade device coupled to a first end of the shaft and a second blade device coupled to a second end of the shaft opposite the first end; and
a housing to accommodate the blade device,
wherein the housing includes an inlet to draw in air and an outlet to open toward the heating body of the fixing unit; and
a drive transmission member to transmit a driving force of the pressure roller of the fixing device to the shaft to rotate the shaft.

7. The fixing device according to claim 6, wherein the shaft of the cooling device extends in parallel to a rotation axis of the heating body.

8. The fixing device according to claim 7, wherein the blade device includes a plurality of the blades extending radially from the shaft and extending parallel to a rotation axis of the shaft.

9. The fixing device according to claim 6, wherein the inlet of the housing is located at a position that is offset with respect to the outlet in a direction along a rotation axis of the shaft.

10. The fixing device according to claim 6, further comprising:
a shutter to adjust an opening area of the outlet of the housing of the cooling device.

11. An image forming apparatus comprising:
a fixing device including:
a rotatable heating body;
a pressure roller that is rotatably pressed against the heating body to convey a print medium; and
a cooling device to cool a part of the heating body based on the print medium being conveyed, wherein the cooling device includes:
a shaft that rotatably extends adjacent to the fixing device;
a pair of blade devices including a first blade device coupled to a first end of the shaft and a second blade device coupled to a second end of the shaft opposite the first end, and
a housing to accommodate the blade device,
wherein the housing includes an inlet to draw in air and an outlet to open toward the heating body; and
a drive transmission member to transmit a driving force of the pressure roller of the fixing device to the shaft to rotate the shaft.

12. The image forming apparatus according to claim 11, wherein the cooling device includes a shutter to adjust an opening area of the outlet of the housing, and
wherein the image forming apparatus comprises a controller to control the shutter based on a size of the print medium to be conveyed between the pressure roller and the heating body.

* * * * *